(12) United States Patent
Indukuri (10) Patent No.: US 8,825,627 B1
(45) Date of Patent: Sep. 2, 2014

(54) CREATING AMBIENCE DURING ON-LINE SHOPPING

(75) Inventor: Kiran Kumar Indukuri, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 13/074,417

(22) Filed: Mar. 29, 2011

(51) Int. Cl.
*G06F 17/30* (2006.01)

(52) U.S. Cl.
USPC ............ 707/710; 707/706; 707/708; 707/738; 707/771

(58) Field of Classification Search
USPC ........................... 707/706, 708, 710, 738, 771
See application file for complete search history.

(56) References Cited

U.S. PATENT DOCUMENTS

| | | | |
|---|---|---|---|
| 2008/0091482 A1* | 4/2008 | Whitsett et al. | 705/6 |
| 2010/0030578 A1* | 2/2010 | Siddique et al. | 705/3 |
| 2012/0150944 A1* | 6/2012 | Steelberg et al. | 709/203 |

OTHER PUBLICATIONS

Jungmi et al. "Effects of design factors on store image and expectation of marchadise quality in web-based stores", copyright 2007 Elsevier Ltd.*

* cited by examiner

*Primary Examiner* — Etienne Leroux
*Assistant Examiner* — Cindy Nguyen
(74) *Attorney, Agent, or Firm* — Hope Baldauff, LLC (57) ABSTRACT

Pages presented by an on-line merchant are configured to create ambience appropriate for products referenced by the pages. An appropriate theme defining visual and/or audible elements may be applied to each requested page to create the ambience. The theme may be customized for a particular geographic location. Keywords associated with a requested page may be identified and utilized to select a theme appropriate for the requested page. An association between product categories and themes may be defined. Keywords associated with a requested page and the categories might be utilized to identify a category. Once the category has been identified, the theme associated with the category may be applied to the requested page. The themed page may be provided for display at a customer computer. The amount of time spent by customers on themed pages may be determined and utilized to determine whether to theme certain pages or categories of pages.

19 Claims, 9 Drawing Sheets

CREATING AMBIENCE DURING ON-LINE SHOPPING

BACKGROUND

An online merchant may provide a large number of products for sale to customers over the Internet. Customers may access information regarding the available products through a web site or other information service provided by the online merchant. Product information may include information needed by a customer to identify and purchase a particular product, such as a description of the product, an image of the product, product specifications, the price and availability of the product, and a mechanism for initiating a purchase of the product.

Online merchants typically utilize the same visual style for displaying product information for all available products. The look and feel may therefore be the same for all product pages provided by an on-line merchant. As a result, customers or potential customers might not remain at a merchant site as long as they would if product pages were more visually interesting and differentiated from one another.

It is with respect to these and other considerations that the disclosure made herein is presented.

DETAILED DESCRIPTION

The following detailed description is directed to technologies for creating ambience during on-line shopping. Through an implementation of the concepts and technologies disclosed herein, ambience can be created for individual pages presented by an on-line merchant, such as product pages, product category pages, and product search results. The ambience created utilizing the mechanisms disclosed herein is consistent with the product, products, or category of products referenced by a displayed page. By creating a unique ambience for different product pages, category pages, and search results pages in this manner, customers may be encouraged to spend more time at an e-commerce site than they would otherwise.

According to one embodiment disclosed herein, ambience is created during on-line shopping by applying appropriate themes to product pages presented by an on-line merchant. As used herein, the term ambience refers to a feeling or mood associated with a displayed page. The themes utilized herein define appropriate visual and/or audible elements for creating ambience for different product categories, sub-categories, and products. For instance, a theme defining soft colors and subtle background music might be applied to a product page for a book on meditation to create a soothing ambience. As another example, a romantic ambience might be created for a product page for a romance novel by applying a theme specifying romantic visual and/or audible elements. Other types of ambience might also be created using themes defining other types of visual and/or audible elements. Some or all of the pages presented by an on-line merchant might be themed in this manner.

According to another embodiment disclosed herein, a merchant system is configured to store data identifying one or more products and data defining one or more themes. Each theme includes data defining a presentation style for a page for creating a desired ambience. For instance, each theme might define one or more of a font style, background color, text color, background image, animation, audio, video, and other visual and/or audible elements. The combination of these elements is intended to convey a particular ambience when applied to a product page and displayed. For instance, the combination of audible and visual elements in a theme might define a romantic ambience, a soothing ambience, a high-tech ambience, a science fiction ambience, or another type of ambience suitable for use with a page referencing a particular product, product category, or collection of search results.

The merchant system is also configured to receive a request for a page corresponding to a product. The page might be a product page corresponding to a single product, a category landing page corresponding to a category of products, or a search results page generated in response to a search for a particular product or products. In response to receiving a page request, the merchant system identifies keywords associated with the requested page.

In the case of a product page for a single product, the merchant system might utilize keywords in the product page, or keywords in a product description for the product. In the case of a category page, the merchant system might utilize keywords associated with the category, or keywords associated with products in the category. In the case of a search results page, the merchant system might utilize the search terms utilized to generate the search results page, or keywords associated with products identified on the search results page.

Once the merchant system identifies keywords associated with the requested page, the merchant system utilizes the keywords to select a theme for use with the requested page. This might be accomplished by comparing the keywords associated with the requested page to keywords associated with the available themes. For instance, if the requested page is a product page for a romance novel, the keywords "love" and "romance" might be contained in the product description for the novel. Similarly, a theme for romance might have associated keywords that include these same terms. As a result, a comparison of the keywords identified for the requested page to the keywords associated with the available themes may result in the selection of the romance theme for use with a product page for a romance novel.

Once an appropriate theme has been selected for the requested page, the merchant system applies the theme to the requested page and returns the themed page to the requesting client for display. For instance, a themed web page might be returned for display to a customer or potential customer in a web browser application program. When the themed web page is displayed, the web page will cause an ambience to be created and presented to the customer that is appropriate for the product, product category, or search results on the page being displayed.

According to another embodiment, the merchant system is configured to store an association between product categories and themes. An association might also be stored between sub-categories and themes and/or individual products and themes. When a request is received for a page, the merchant system identifies keywords associated with the requested page. The keywords associated with the requested page are then utilized to identify a product category. This may be accomplished, for instance, by comparing the keywords associated with the requested page with keywords associated with each category.

Once a category has been identified, a theme associated with the identified category is selected. The selected theme is then applied to the requested page to create a themed page. The themed page is returned in response to the original page request. When the themed page is displayed, the page will cause an appropriate ambience to be created that is appropriate for the product, product category, or search results on the page being displayed.

In other embodiments, the theme may be customized for particular geographic locations and selected based upon the geographic location of a customer. Additionally, the amount of time spent at an e-commerce site by customers receiving themed pages may be compared to the amount of time spent at the site by customers not receiving themed pages. The results of the comparison may be utilized to determine whether to present themed pages to customers in the future, to determine which pages should be themed, and for other purposes.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
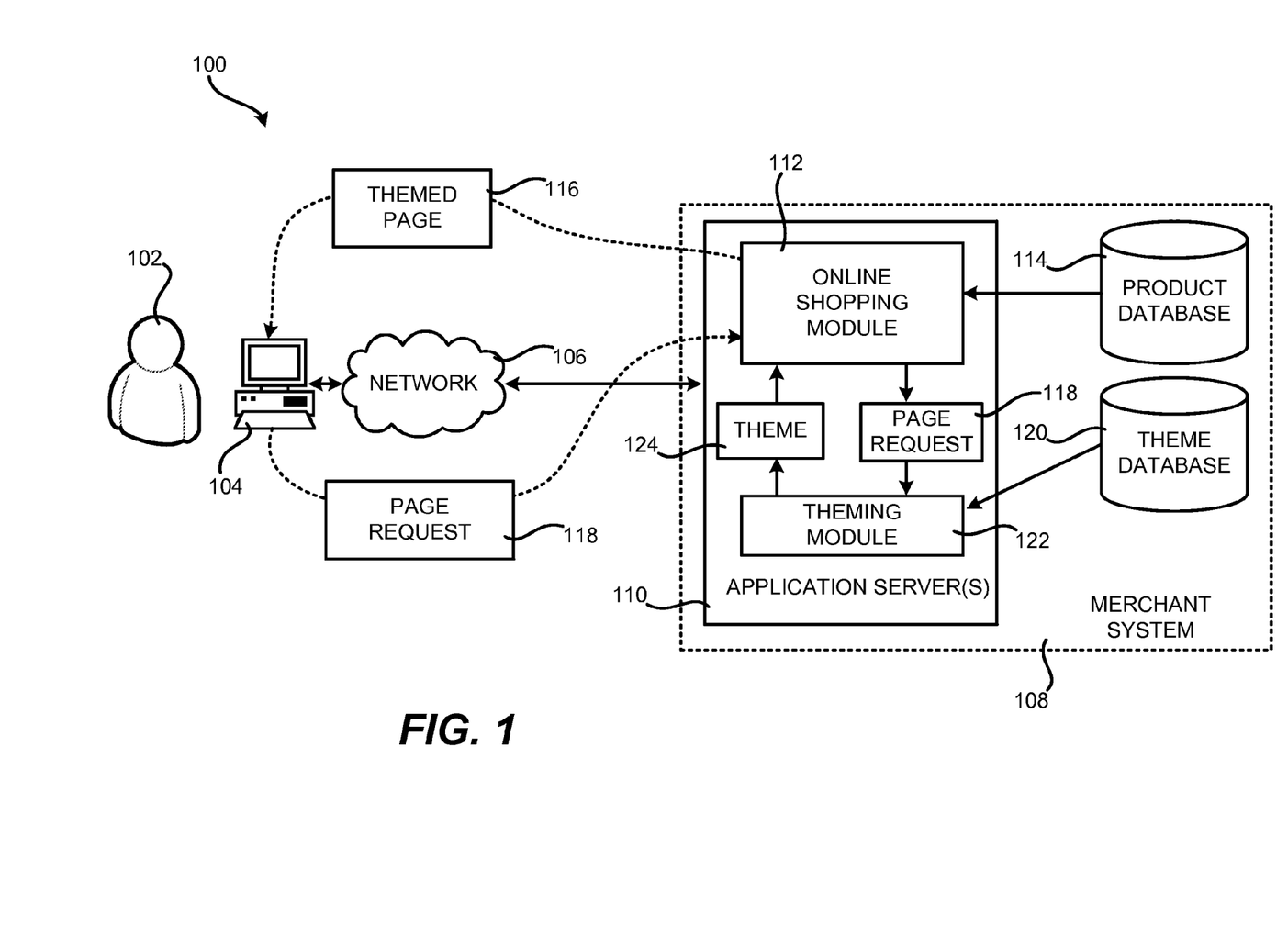
FIG. 1 is a system diagram showing aspects of one illustrative operating environment for implementing the concepts and technologies disclosed herein for creating ambience during on-line shopping.

FIG. 1 and the following description are intended to provide a brief, general description of a suitable computing environment in which the embodiments described herein may be implemented. In particular, FIG. 1 is a system and network diagram that shows an illustrative operating environment 100 including several software components for creating ambience during on-line shopping.

The environment 100 includes a customer 102 that uses a customer computer 104 to access a merchant system 108 across a network 106. The customer 102 may be an individual or entity that desires to purchase one or more products from the online merchant that operates the merchant system 108. The customer computer 104 may be a personal computer ("PC"), a desktop workstation, a laptop, a tablet computer, a notebook, a personal digital assistant ("PDA"), an electronic-book reader, a game console, a set-top box, a consumer electronics device, a server computer, or any other computing device capable of connecting to the network 106 and communicating with the merchant system 108.

The network 106 may be a local-area network ("LAN"), a wide-area network ("WAN"), the Internet, or any other networking topology known in the art that connects the customer computer 104 to the merchant system 108. The merchant system 108 may include a number of application servers 110 that provide various online shopping services to the customer computer 104 over the network 106. The customer 102 may use a client application executing on the customer computer 104 to access and utilize the online shopping services provided by the application servers 110.

In one embodiment the client application is a web browser application, such as the MOZILLA® FIREFOX® web browser from MOZILLA FOUNDATION of Mountain View, Calif. The web browser application exchanges data with the application servers 110 in the merchant system 108 using the hypertext transfer protocol ("HTTP") over the network 106. The client application might also be a stand-alone client application configured for communicating with the application servers 110. The client application might also utilize any number of communication methods known in the art to communicate with the merchant system 108 and/or the application servers 110 across the network 106, including remote procedure calls, SOAP-based web services, remote file access, proprietary client-server architectures, and the like.

The application servers 110 may execute a number of modules in order to provide the online shopping services to the customer computer 104. The modules may execute on a single application server 110 or in parallel across multiple application servers in the merchant system 108. In addition, each module may consist of a number of subcomponents executing on different application servers 110 or other computing devices in the merchant system 108. The modules may be implemented as software, hardware, or any combination of the two.

According to one embodiment, an online shopping module 112 executes on the application servers 110. The online shopping module 112 provides on-line shopping functionality through which the customer 102 may browse and purchase products available from the online merchant that operates the merchant system 108. For instance, the online shopping module 112 may retrieve information regarding a particular product offered for sale by the online merchant from a product database 114, generate a product page containing the product information, and transmit the product page over the network 106 to the client application executing on the client computer 104 for display to the customer 102. Information regarding each product offered for sale might be stored in a product database 114 maintained by the merchant system 108. The products represented in the product database 114 may be organized by categories. Additional details regarding the structure of a product database 114 utilized in one embodiment disclosed herein will be provided below with regard to FIG. 3.

The pages transmitted by the application servers 110 to the client computer 104 may be web pages consisting of hypertext markup language ("HTML"), extensible markup language ("XML"), and/or JAVASCRIPT object notation ("JSON") that contain the product information along with instructions regarding how the product details are to be displayed on the customer computer 104, for example. It will be appreciated that any number of methods and technologies may be utilized that allow the online shopping module 112 to encode the product information in a product page and send the product page to the customer computer 104 for display to the customer 102. Other information transmitted from the online shopping module 112 to the client computer 104 may be similarly formatted.

According to embodiments, the online shopping module 112 is also configured to provide functionality for creating ambience during on-line shopping. In particular, the online shopping module 112 is configured in one embodiment to receive a page request 118 from the customer computer 104. The page request 118 might be for a page corresponding to a single product, a category of products, or a search results page identifying one or more products that is generated by the online shopping module 112 in response to keywords and a search request provided by the customer 102.

In response to receiving the page request 118, the online shopping module 112 is configured to generate and return a themed page 116 for the page requested by the page request 118. When the themed page 116 is presented at the customer computer 104, an ambience will be created that is appropriate for the product, product category, or search results referenced by the page. As discussed briefly above, the term ambience as used herein refers to a feeling or mood associated with a displayed page.

In one embodiment, the online shopping module 112 operates in conjunction with a theming module 122 in order to generate the themed page 116. It should be appreciated, however, that the online shopping module 112 might perform the functionality described herein without the use of any external modules, or by using other modules not disclosed herein.

In the embodiment shown in FIG. 1, the theming module 122 maintains a theme database 120. The theme database 120 stores various themes 124 that can be applied to a page generated by the merchant system 108 to create a themed page 116. Each theme 124 includes data defining a presentation style for a page. For instance, each theme 124 might define one or more of a font style, background color, text color, background image, animation, audio, video, and other visual and/or audible elements. The combination of these elements set forth in each theme 124 is intended to convey a particular ambience when applied to a page and displayed. Additional details regarding the structure and use of the theme database 120 will be provided below with regard to FIG. 2.

When the online shopping module 112 receives a page request 118, the online shopping module 112 provides the page request 118 to the theming module 122. In response thereto, the theming module 122 selects a theme 124 from the theme database 120 that will convey an appropriate ambience for the product, product category, or search results referenced by the page requested in the page request 118.

As will be described in detail below, the theming module 122 might identify keywords associated with a page requested by the page request 118 and utilize the keywords to select a theme 124 appropriate for the requested page. An association between product categories and themes 124 in the theme database 120 might also be defined. Keywords associated with a requested page and with the categories might be utilized to identify a category. The theme 124 associated with the identified category may be selected and utilized to create the themed page 116.

Once the theming module 122 has selected an appropriate theme 124, the theming module 122 might provide the selected theme 124 to the online shopping module 112. In turn, the online shopping module 112 may apply the theme 124 to a page requested in the page request 118 to generate the themed page 116. In alternative embodiments, the theming module 122 applies the selected theme 124 to the requested page to generate the themed page 116. Other components not shown in FIG. 1 might also perform this functionality.

Once the themed page 116 has been generated, it is returned to the customer computer 104 in response to the page request 118. The themed page 116 is then rendered and presented by the client application executing on the customer computer 104. Presentation of the themed page 116 causes an ambience to be created at the customer computer 104 that is appropriate for the product, product category, or search results referenced by the page being displayed. Additional details regarding these processes, and others, will be provided below with regard to FIGS. 2-9.

It should be appreciated that, according to various embodiments, the online shopping module 112 also provides functionality for allowing the customer 102 to specify preferences regarding the use of the themes 124. For instance, the online shopping module 112 might allow the customer 102 to specify that themes 124 not be used or that only certain elements in the themes 124 be used. As an example, the customer 102 might be permitted to specify that visual elements of a theme 124 may be utilized but that audio elements of the theme 124 should not be utilized. The online shopping module 124 might provide other types of functionality for allowing the customer 102 to define the manner in which the themes 124 are applied to pages requested by the customer 102.

Figure 2:
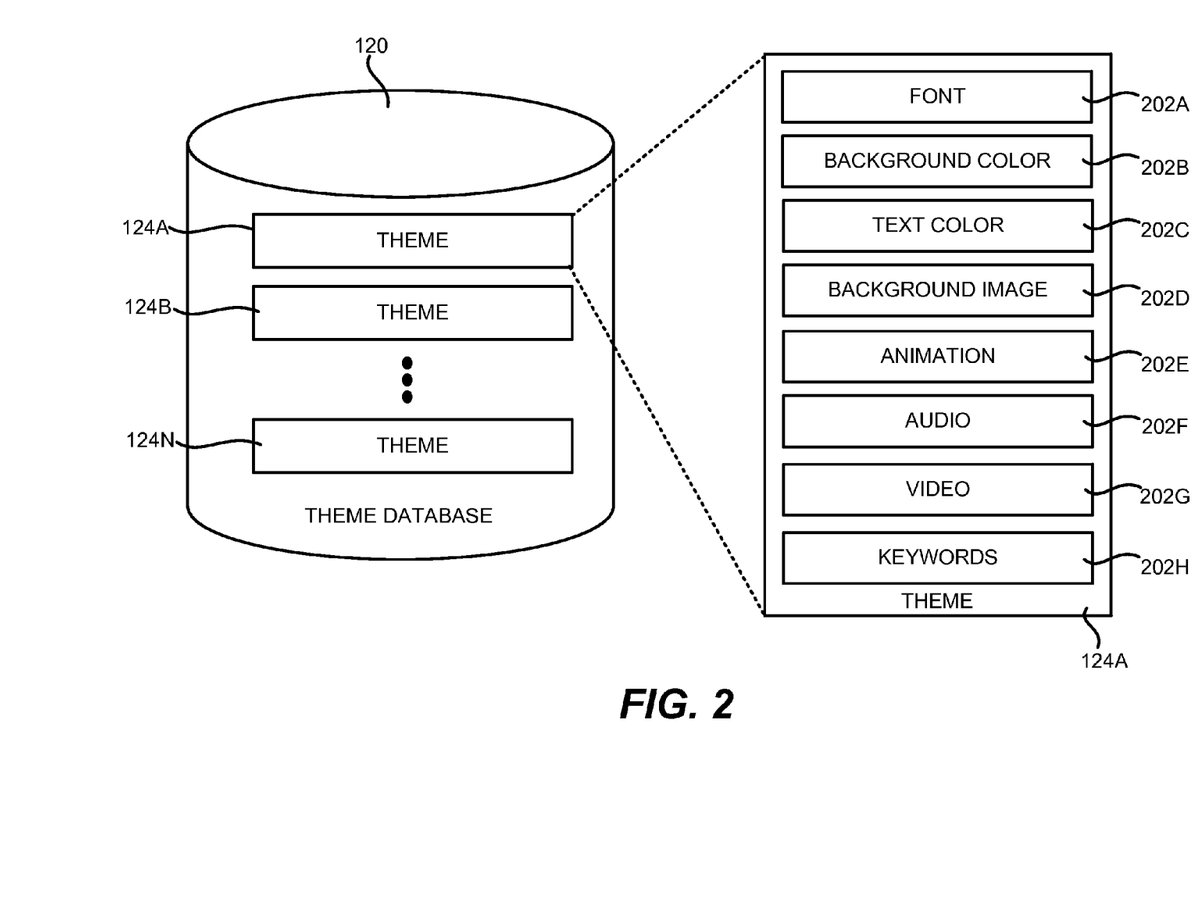
FIG. 2 is a database diagram showing the structure of a theme database utilized in various embodiments disclosed herein for creating ambience during on-line shopping.

FIG. 2 is a database diagram showing the structure of the theme database 120 utilized by the theming module 122 in various embodiments disclosed herein for creating ambience during on-line shopping. As illustrated in FIG. 2 and described briefly above, the theme database 120 is configured to store the themes 124A-124N (which may be referred to herein individually as "a theme 124" or collectively as "the themes 124").

Each theme 124 includes data defining a presentation style for a page. For instance, each theme 124 might include various data fields storing data defining various aspects of a presentation style for a page. In the example shown in FIG. 2, the theme 124A includes a field 202A storing data defining a font style for a page, a field 202B storing data defining a background color for a page, a field 202C storing data defining a text color for a page and a field 202D storing data defining a background image for a page. The theme 124A also includes a field 202E defining an animation for use on a page, a field 202F defining audio to be played when a page is viewed, and a field 202G for defining a video to be played when a page is viewed.

It should be appreciated that the combination of elements defined by the data stored in the fields 202A-202G is intended to convey a particular ambience when applied to a page and displayed. For instance, the combination of audible and visual elements defined in a theme 124A might define a romantic ambience, a soothing ambience, a high-tech ambience, or another type of ambience suitable for use with a page referencing a particular product, product category, or search results.

According to one embodiment, each theme 124 also has keywords associated therewith that describe the type of ambience created by the theme or the type of product that the theme 124 is intended for use with. For instance, in the example illustrated in FIG. 2, the theme 124A includes a field 202H for storing keywords associated with the theme 124A. If the theme 124A defines a romantic ambience, the keywords might be "romance," "love," and/or similar terms. If the theme 124A defines a soothing ambience, the keywords might be "calm," "quiet," "relaxing," and the like. Other appropriate keywords might be defined for other types of themes defining other types of ambience. As will be discussed in greater detail below, the keywords defined for each theme 124 might be utilized to identify an appropriate theme for use with a particular page.

In one embodiment, the themes 124 are implemented utilizing Cascading Style Sheets ("CSS"). As known in the art, CSS is a style sheet language utilized to describe the presentation semantics of a document written in a markup language. CSS may be utilized to style web pages written in HTML, Extensible HTML ("XHTML"), and other types of XML documents. CSS may be applied to a page by inserting the CSS in-line within the page or storing the CSS external to a page and associating the CSS with the page. It should be appreciated that while CSS is utilized in one embodiment disclosed herein, other technologies might also be utilized in conjunction with, or instead of, CSS to define and implement the themes 124. For instance, HTML 5, JAVASCRIPT, FLASH, and other technologies might be utilized to define visual and audible elements of a theme 124.

It should also be appreciated that the contents and structure of the theme database 120 shown in FIG. 2 is merely illustrative and that the theme database 120 might store fewer or additional fields 202 than those shown in FIG. 2. It should also be appreciated that each theme 124 might only include data for a subset of the fields 202. Other structures and technologies might also be utilized to define a theme 124 for use in the manner described herein.

Figure 3:
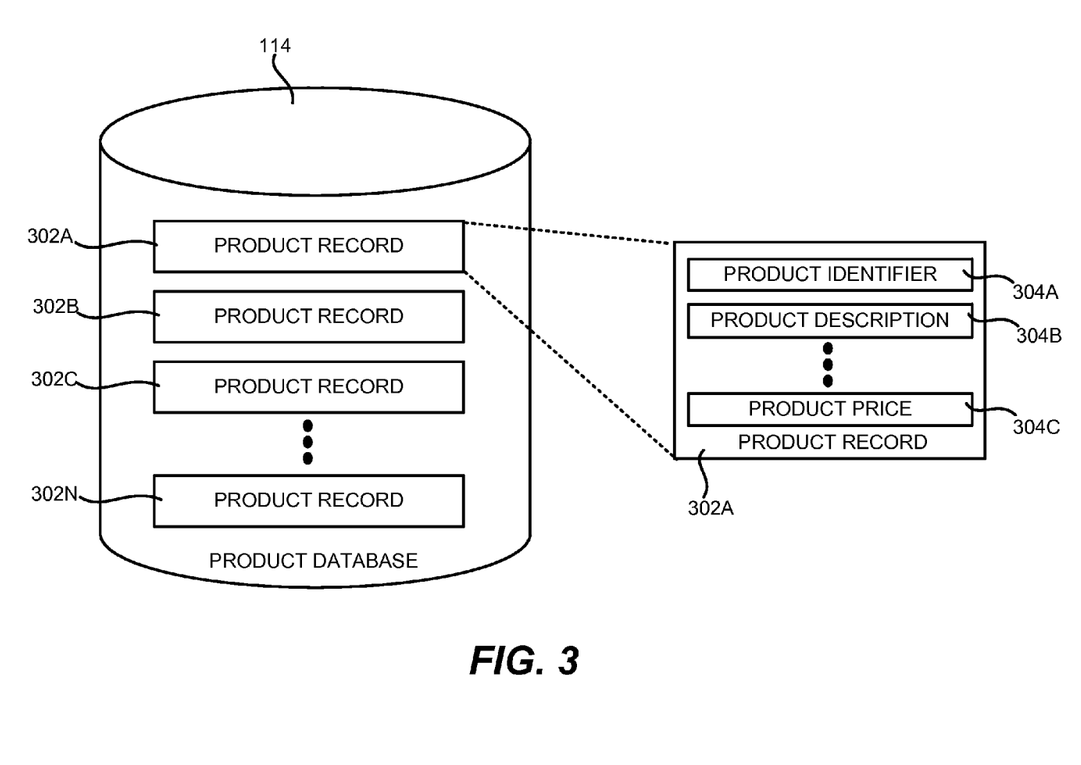
FIG. 3 is a database diagram showing the structure of a product database utilized in various embodiments disclosed herein for creating ambience during on-line shopping.

FIG. 3 is a database diagram showing the structure of a product database 114 utilized in various embodiments disclosed herein for creating ambience during on-line shopping. As discussed briefly above, the online shopping module 112 maintains a product database 114 for storing information regarding each product offered for sale by the merchant system 108. In one embodiment, the product database 114 includes a product record 302A-302N for each product offered for sale by the merchant system 108. Each product record 302 includes data regarding one product offered for sale.

The example product record 302A shown in FIG. 3 includes several fields 304A-304C. The field 304A is utilized to store a product identifier. For instance, each product might be given an identifier that uniquely identifies the product. The field 304B is utilized to store a product description 304B for the product. For instance, the field 304B might be utilized to store a textual description of the product that is displayed on a product page for the product. The product record 302A might also include a field 304C for storing a price for the product.

As will be described in greater detail below, keywords contained in the product description field 304B for each product may be utilized to identify an appropriate theme 124 for use when displaying a product page for the product. In other embodiments, other keywords might be utilized. For instance, keywords might be defined in a separate field of the product record 302 for use in theme identification, keywords might be defined and stored separately from the product record 302, or keywords might be identified dynamically based upon information associated with a product, such as its name, reviews of the product, or other information. Other mechanisms for defining, storing, and utilizing themes associated with a product might also be utilized.

It should be appreciated that the product database 114 shown in FIG. 3 has been greatly simplified and that the product database 114 and the product records 302 might include more information than shown in FIG. 3. It should also be appreciated that the information shown in FIG. 3 might also be organized in a different fashion. Appropriate database technologies may be utilized to implement the theme database 120 and the product database 114. Additional details regarding the use of the data stored in the theme database 120 and the product database 114 will be provided below with regard to FIGS. 4-9.

Figure 4:
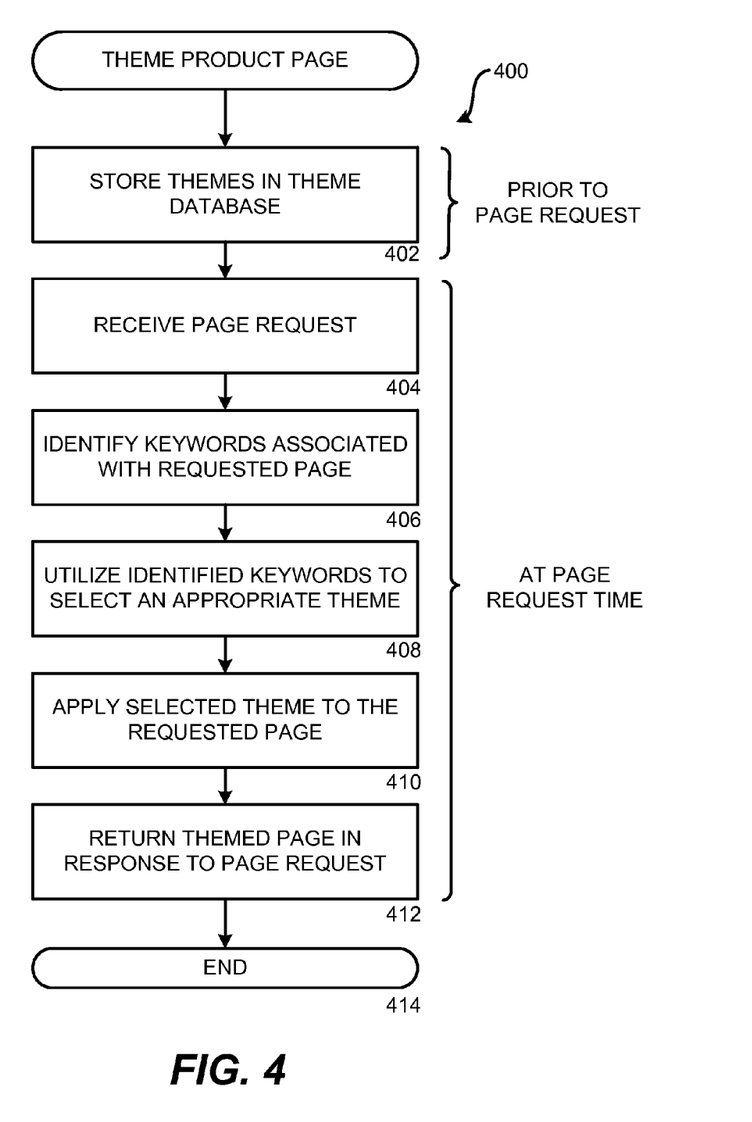
FIG. 4 is a flow diagram showing one illustrative routine disclosed herein in embodiments for creating ambience during on-line shopping by applying a theme to a product page.

Turning now to FIG. 4, additional details will be provided regarding the embodiments described herein for creating ambience during on-line shopping. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 is a flow diagram showing one illustrative routine 400 disclosed herein in embodiments for creating ambience during on-line shopping by applying a theme 124 to a product page. In the embodiment illustrated in FIG. 4, the theming module 122 identifies a theme 124 for a requested page by comparing keywords associated with the requested page to keywords associated with the themes 124 stored in the theme database 120. Additional details regarding this process will be provided below.

The routine 400 begins at operation 402, where the themes 124 are stored in the theme database 120 in the manner described above. As also discussed above, each theme 124 may have descriptive keywords stored therewith in the theme database 120. These keywords are utilized in the embodiment shown in FIG. 4 to identify an appropriate theme 124 for a requested page. From operation 402, the routine 400 proceeds to operation 404.

At operation 404, the online shopping module 112 receives a page request 118. The requested page might be a product page corresponding to a single product, a category landing page corresponding to a category of products, a search results page generated in response to a search for a particular product or products, or another type of page. From operation 404, the routine 400 proceeds to operation 406.

At operation 406, the online shopping module 112 or the theming module 122 identifies keywords associated with the requested page. In the case of a product page for a single product, the identified keywords may be contained in the requested product page or in a product description, such as those keywords stored in the field 304B, for the product. In the case of a category page, the identified keywords may be keywords associated with the category or keywords associated with products in the category. In the case of a search results page, the identified keywords may be the search terms utilized to generate the search results page or keywords associated with products identified on the search results page. Once keywords associated with the requested page have been identified, the routine 400 proceeds from operation 406 to operation 408.

At operation 408, the theming module 122 utilizes the keywords to select a theme 124 for use with the requested page. In one embodiment, the theming module 122 selects an appropriate theme 124 by comparing the keywords identified as being associated with the requested page to keywords associated with the available themes, such as those stored in the field 202H.

For instance, if the requested page is a product page for a romance novel, the keywords "love" and "romance" might be contained in the product description for the novel. Similarly, a theme for romance might have associated keywords including these same terms. As a result, a comparison of the keywords identified for the requested page to the keywords associated with the available themes may result in the selection of the romance theme for use with a product page for a romance novel. Once an appropriate theme 124 has been selected for the requested page, the routine 400 proceeds from operation 408 to operation 410.

At operation 410, the theming module 122 or the online shopping module 112 applies the selected theme to the requested page to create a themed page 116. This is accomplished in one embodiment, for instance, by inserting the CSS defined by the theme into the product page. The selected theme might also be applied to a page in other ways and using other technologies.

Once the selected theme 124 has been applied to the product page to create a themed page 116, the routine 400 proceeds to operation 412 where the online shopping module 112 returns the themed page 116 to the requesting client for display. For instance, the themed page 116 might be returned to a client application executing on the client computer 104 for display. When the themed page 116 is presented at the client computer 104, the themed page 116 will cause an ambience to be created and presented to the customer 102 that is consistent with the product, product category, or search results on the page being displayed. From operation 412, the routine 400 proceeds to operation 414, where it ends. It should be appreciated that operation 402 is typically performed prior to receiving a page request 118, while the operations 404-412 are typically performed in response to receiving a page request 118.

Figure 5:
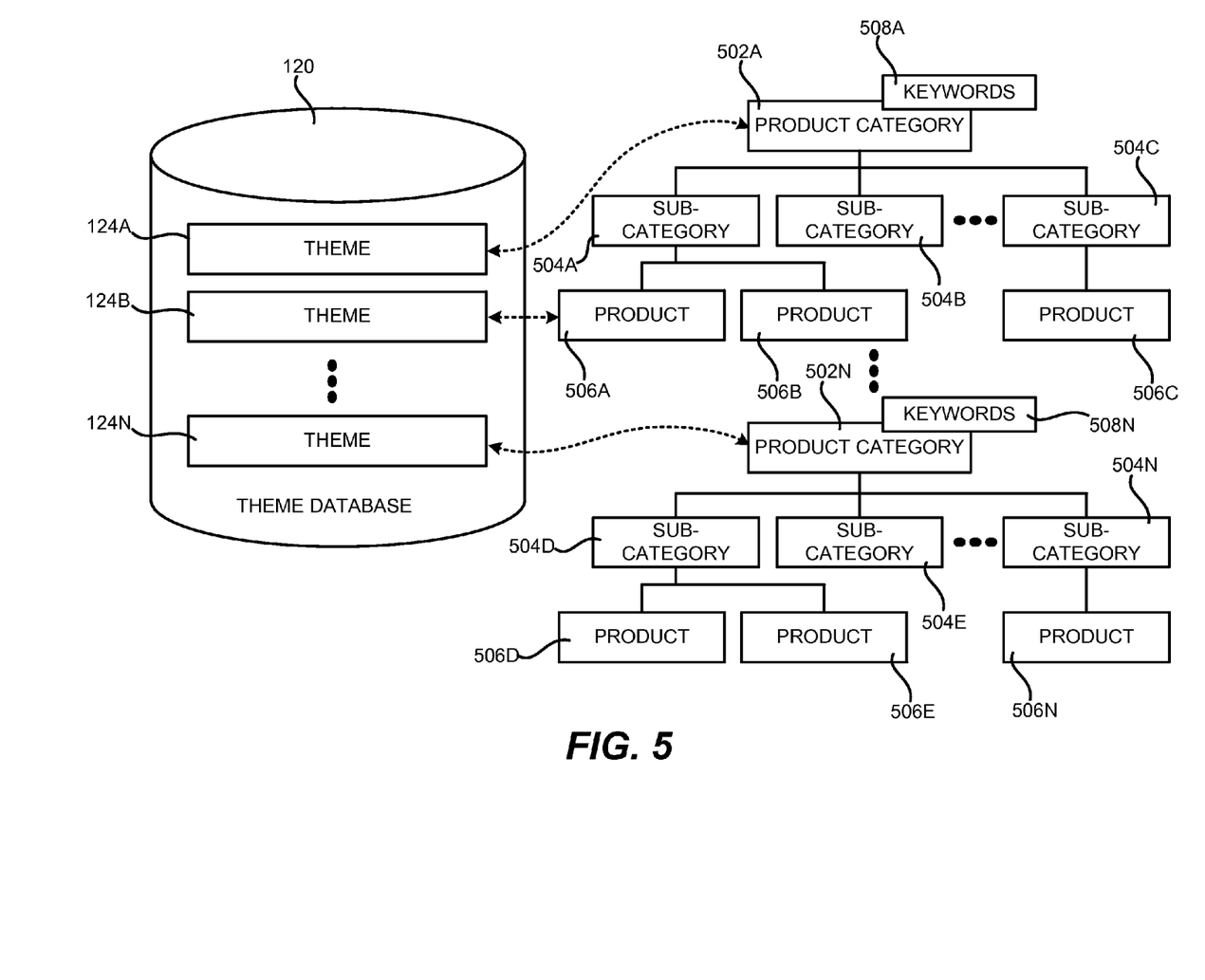
FIG. 5 is a database and data structure diagram showing aspects of one process disclosed herein for associating themes with product categories, sub-categories, and products, according to one embodiment disclosed herein.

FIG. 5 is a database and data structure diagram showing aspects of one process disclosed herein for associating themes 124 with product categories, sub-categories, and products, according to one embodiment disclosed herein. As will be discussed in greater detail below, the association between themes 124 and product categories may be utilized to identify an appropriate theme 124 for a requested page in one embodiment.

As discussed briefly above, the products identified in the product database 114 may be assigned to one or more categories. For instance, books, CDs, DVDs, candles, and other items might be assigned to a category for romantic items. As another example, film and digital cameras might be assigned to a category for cameras. Similarly, electronic items, such as computers, computer peripherals, digital audio players, and other electronic devices might be assigned to a category for electronics. Other types of categories might also be assigned to other types of products. Each product might also be assigned to multiple categories.

In one embodiment, themes 124 are assigned to product categories, sub-categories, and potentially even individual products. This process is illustrated in FIG. 5. In the example shown in FIG. 5, a product category 502A has the sub-categories 504A-504C. The products 506A-506B are in the sub-category 504A and the product 506C is in the sub-category 504C. The product category 502N has the sub-categories 504D-504N. The sub-category 504D includes the products 506D-506E and the sub-category 504N includes the product 506N. It should be appreciated that the arrangement shown in FIG. 5 is merely illustrative and that typical category relationships will be more complicated and include many more items than shown in FIG. 5.

As also shown in FIG. 5, the product categories 502A-502N have keywords 508A-508N, respectively, assigned thereto. The keywords 508 describe the sub-categories 504 and products 506 in the given product category 508. For instance, if the product category 502A corresponds to garden tools, the keywords 508A might include the terms "garden," "outdoor," "tools," "gardening," and others. As discussed above, the themes 124 stored in the theme database 120 may also have keywords assigned thereto.

According to one embodiment disclosed herein, at least one theme 124 is assigned to each product category 502. For instance, in the example shown in FIG. 5, the theme 124A has been assigned to the product category 502A and the theme 124N has been assigned to the product category 502N. Themes 124 might also be assigned to sub-categories 504 and to individual products 506. For instance, in the example shown in FIG. 5, the theme 124B has been assigned to the product 506A. In this manner, a themed page 116 can be created that is customized for products 506 in a particular product category 502, in a sub-category 504, or even for individual products 506. Products 506 and sub-categories 504 that do not have a theme 124 directly assigned thereto, may inherit the assignment of a theme 124 from a parent sub-category 504 or parent product category 502.

The themes 124 might be assigned to the product categories 502 by comparing the keywords associated with each theme 124 to the keywords 508 assigned to each product category 502, sub-category 504, or product 506. In this manner, the process of assigning themes 124 to product categories 502, sub-categories 504, and products 506 may be automated. The online shopping module 112 or the theming module 122 might also provide a mechanism for allowing a user to manually assign themes 124 to product categories 502, sub-categories 502, and products 506. Other mechanisms might also be utilized to assign themes 124 to product categories 502, sub-categories 504, and products 506. As will be described in greater detail below with regard to FIG. 6, the assignment of themes 124 to the product categories 502, sub-categories 504, and products 506 may be utilized to identify an appropriate theme 124 for a requested page.

Figure 6:
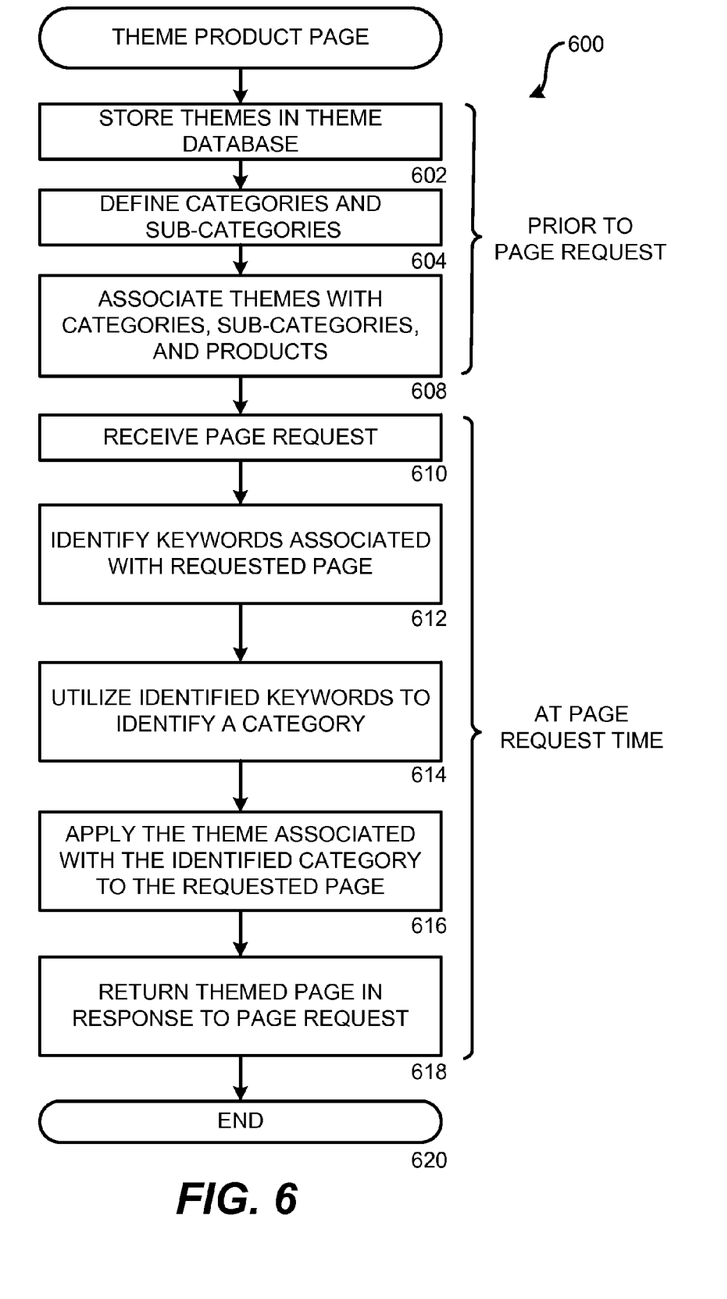
FIG. 6 is a flow diagram showing another illustrative routine disclosed herein in embodiments for creating ambience during on-line shopping by applying a theme to a product page.

FIG. 6 is a flow diagram showing another illustrative routine 600 disclosed herein in embodiments for creating ambience during on-line shopping by applying a theme 124 to a product page. In this embodiment, the associations between themes 124 and product categories 502, sub-categories 504, and products 506 are utilized to identify an appropriate theme for a requested page.

The routine 600 begins at operation 600, where the themes 124 are stored in the theme database 120 in the manner described above with regard to FIG. 2. The routine 600 then proceeds to operation 604, where the product categories 502 and sub-categories 504 are defined. The keywords 508 may then be assigned to the product categories 502 and, potentially, to the sub-categories 504. The routine 600 then proceeds to operation 608.

At operation 608, the themes 124 are associated with the product categories 502, sub-categories 504, and products 506 in the manner described above with regard to FIG. 5. It should be appreciated that not every product category 502, sub-category 504, and product 506 may have a theme 124 assigned thereto. As discussed above, products 506 and sub-categories 504 may inherit a theme 124 assigned to a parent sub-category 504 or category 502. A default theme 124 might also be specified for product categories 502 that do not have a theme assigned thereto. Once the themes 124 have been assigned, the routine 600 proceeds from operation 608 to operation 610.

At operation 610, the online shopping module 112 receives a page request 118. In response thereto, the routine 600 proceeds from operation 610 to operation 612, where the online shopping module 112 or the theming module 122 identifies keywords associated with the requested page. As discussed above with regard to FIG. 4, the identified keywords may be contained in the requested page or in a product description in the case of a product page for a single product. In the case of a category page, the identified keywords may be keywords associated with the category or keywords associated with products in the category. In the case of a search results page, the identified keywords may be the search terms utilized to generate the search results page or keywords associated with products identified on the search results page. Once keywords associated with the requested page have been identified, the routine 600 proceeds from operation 612 to operation 614.

At operation 614, the keywords identified as being associated with the requested page are then utilized to identify a product category 502, sub-category 504, or product 506. This may be accomplished, for instance, by comparing the keywords identified as being associated with the requested page with keywords 508 associated with each category 502 to identify similarities.

Once a category 502, sub-category 504, or product 506 has been identified, the theme 124 associated with the identified category 502, sub-category 504, or product 506 is selected at operation 616. The selected theme 124 is then applied to the requested page to create a themed page 116. The themed page 116 is then returned in response to the original page request 118 at operation 618. When the themed page 116 is presented, the themed page 116 will cause an ambience to be created that is appropriate for the product or product category on the page being displayed. From operation 618, the routine 600 proceeds to operation 620, where it ends. It should be appreciated that operations 602-608 are typically performed prior to receiving a page request 118, while the operations 610-618 are typically performed in response to receiving a page request 118.

Figure 7:
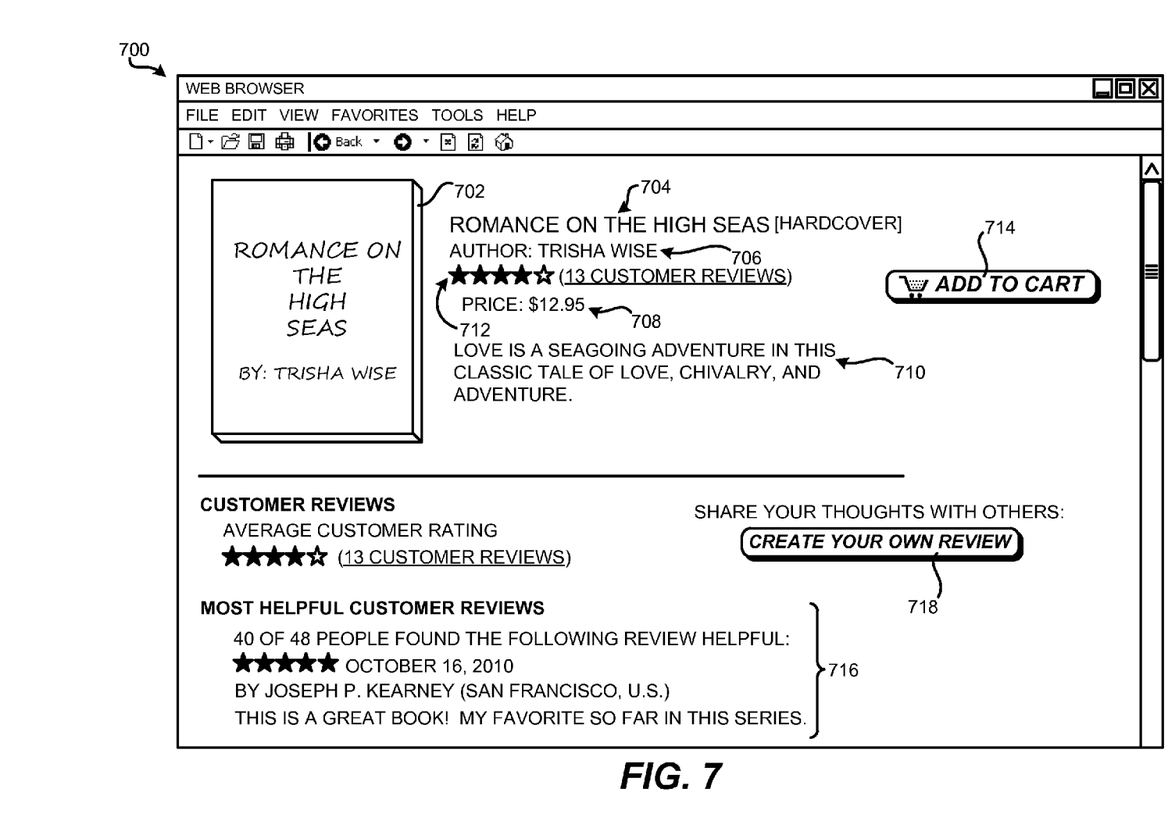
FIGS. 7 and 8 are user interface diagrams showing an illustrative product page before and after applying the various technologies disclosed herein for creating ambience during on-line shopping.
Figure 8:
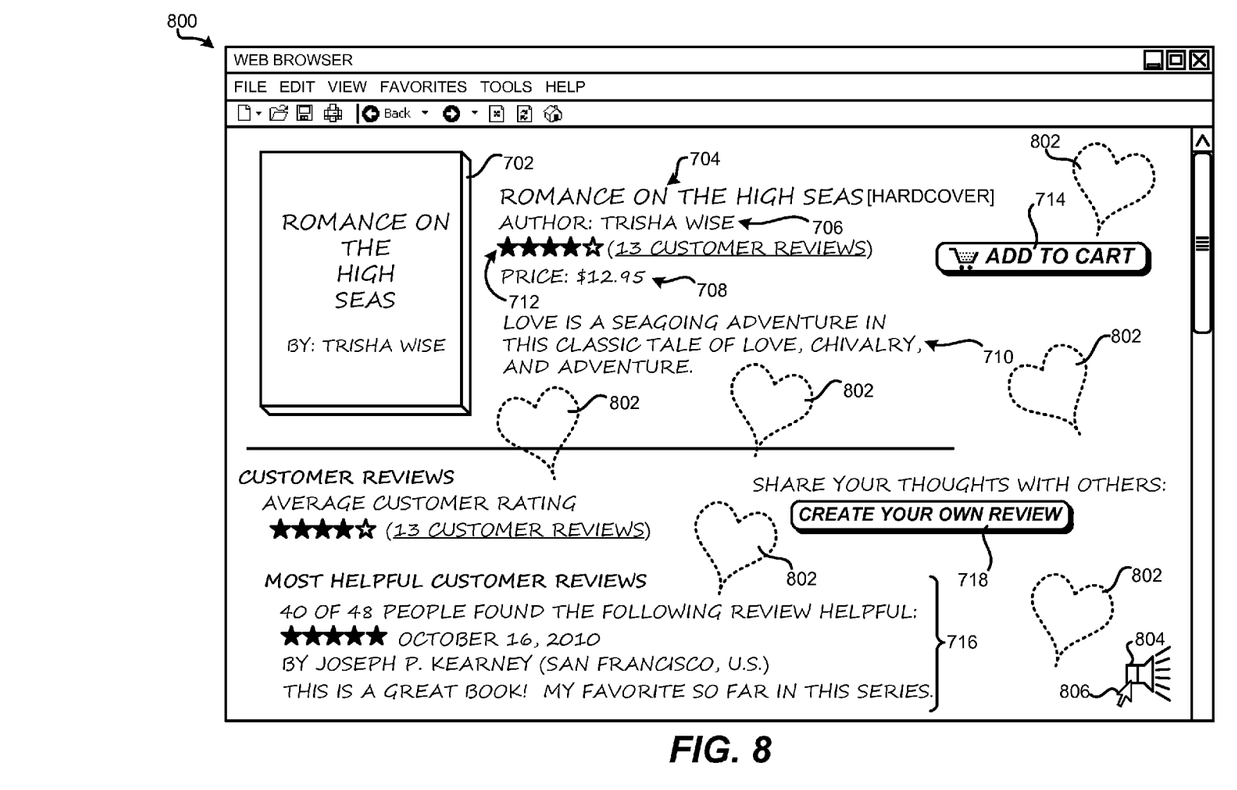

FIGS. 7 and 8 are user interface diagrams showing the display of an illustrative product page before and after applying the various technologies disclosed herein for creating ambience during on-line shopping. In particular, FIG. 7 shows a display 700 of a product page for a product offered for sale by the merchant system 108. The illustrative product page is for a romance novel.

The display 700 includes an image 702 of the novel, text 704 indicating the name of the novel, text 708 indicating the price of the novel, and text 706 indicating the name of the author of the novel. Text 710 is also provided that provides a description of the novel. As discussed above, keywords contained in the product description might be utilized to identify an appropriate theme 124 to apply to the illustrated product page.

According to embodiments, the product page shown in FIG. 7 might also include other elements. For instance, a user interface button 714 may be provided which, when selected, will initiate a purchase of the displayed product. Additionally, text 716 might also be provided showing reviews of the product provided by other customers. A user interface button 718 might also be provided which, when selected, will initiate a process for allowing a customer to create his or her own review of the product. It should be appreciated that the display 700 shown in FIG. 7 is merely illustrative and that fewer or more user interface elements may be provided and that the user interface elements might be displayed in a different manner.

It should be appreciated that, in various embodiments, it may be possible for two themes 124 to be identified that are equally appropriate for creating a desired ambience for a particular product page. For instance, a customer 102 might search for "romantic comedy." In this case a theme 124 for creating a romantic ambience might be as appropriate as a theme 124 for creating a comedic ambience. In this case, an appropriate mechanism might be utilized to select one of the possible themes 124. For instance, the hierarchy shown in FIG. 5 might be utilized to select one of several possible themes. Weights might also be given to terms in a product page in order to select the appropriate theme 124. Other mechanisms for selecting one of several appropriate themes 124 might also be utilized.

FIG. 8 shows a display 800 for the product page shown in FIG. 7 after application of an appropriate theme 124 to the product page. In this example, the keyword "love" in the product description and "romance" in the product name have been utilized to identify a theme 124 that has been defined to create a romantic ambience. In particular, the theme 124 includes data indicating that a more classical, and potentially romantic, font style should be utilized.

The theme 124 utilized in FIG. 8 also indicates that romantic colors such as pink or red (not shown in FIG. 8) should be utilized, and that a background image including heart shapes 802 should be displayed. In this example, an audio file is also specified in the identified theme 124 for playing romantic music while the product page is being viewed. An appropriate user interface control 804 might be provided which, when selected through the use of a mouse cursor 806 or another type of input device, will cause the audio playback to be muted.

It should be appreciated that the display 800 shown in FIG. 8 is merely illustrative and that more or fewer page elements might be modified by the selected theme 124 than shown in FIG. 8. Additionally, other elements not shown in FIG. 8 might be utilized, such as animation, video, and other types of multimedia elements. In this regard it should be appreciated that the display 800 shown in FIG. 8 is only one example of the type of theme 124 that may be applied to an e-commerce page to create ambience and should not be considered limiting in any way.

It should be appreciated that, in other embodiments, the themes 124 may be customized to provide an appropriate ambience for the geographical location of a customer 102. For instance, themes 124 may be defined with visual and/or audible elements corresponding to various geographical locations. When a customer 102 makes a page request 118, the location of the customer may be determined utilizing the Internet Protocol ("IP") address of the customer computer 104 or using another mechanism. The determined geographical location can then be utilized to select an appropriate theme 124 to provide an ambience consistent with the location of the customer 102. For instance, a theme 124 might be selected and utilized that presents an image of the Rocky Mountains for a customer located in Colorado that searches for snow skis. In this manner, the ambience presented to the customer 102 can be customized based upon both the product page requested by the customer 104 and the geographical location of the customer 104.

In other embodiments, a mechanism may be provided for verifying that the application of themes 124 to product pages as disclosed herein results in customers actually spending more time at an e-commerce site. In this regard, the amount of time spent at the site by customers 102 that receive themed pages may be compared to the amount of time spent at the site by customers 102 that do not receive themed pages. The results of such an analysis might be utilized to determine the particular product categories and types of customers for which theming product pages in the manner disclosed herein results in additional time being spent at the e-commerce site.

The results of the analysis described above might also be utilized to theme certain pages for certain categories of products and not to theme pages for other categories of products. For instance, if it is determined that customers that view romantic products stay at the site longer if they receive themed pages, then themed pages may be provided for customers viewing products in the romantic category. Similarly, it may be determined that customers viewing electronic products do not stay longer at the site when provided themed pages. In this case, themed pages may not be provided to customers viewing products in the electronics category. Other types of modifications might also be performed based upon collected data indicating whether customers that receive themed pages stay at the site longer, purchase a greater quantity of goods, or other factors.

Figure 9:
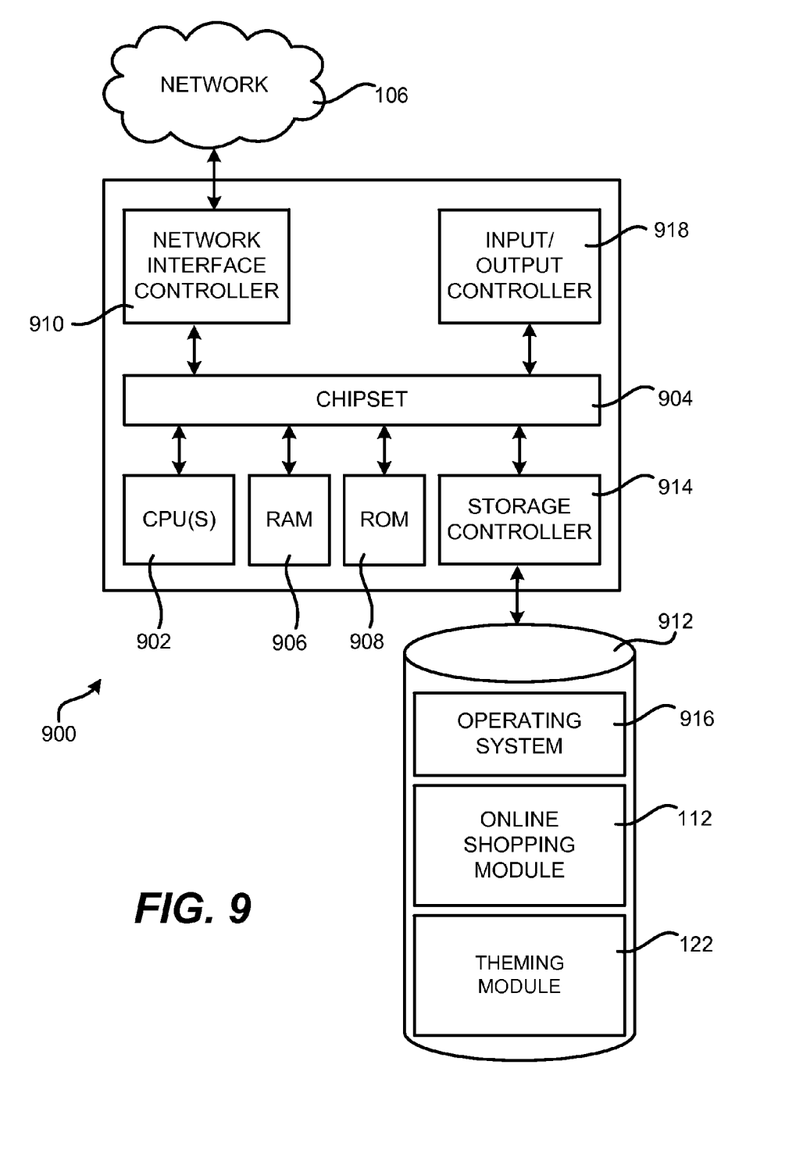
FIG. 9 is a computer architecture diagram showing one illustrative computer hardware architecture for use in computing devices configured to implement the concepts and technologies disclosed herein in one embodiment.

FIG. 9 shows an example computer architecture for a computer 900 capable of executing the software components described herein for creating ambience during on-line shopping in the manner presented above. The computer architecture 900 shown in FIG. 9 illustrates a conventional server computer, workstation, desktop computer, laptop, PDA, electronic book reader, digital wireless phone, network appliance, set-top box, or other computing device, and may be utilized to execute any aspects of the software components presented herein described as executing on the application servers 110, the customer computer 104, or other computing platform.

The computer 900 includes a baseboard, or "motherboard," which is a printed circuit board to which a multitude of components or devices may be connected by way of a system bus or other electrical communication paths. In one illustrative embodiment, one or more central processing units ("CPUs") 902 operate in conjunction with a chipset 904. The CPUs 902 are standard programmable processors that perform arithmetic and logical operations necessary for the operation of the computer 900.

The CPUs 902 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 904 provides an interface between the CPUs 902 and the remainder of the components and devices on the baseboard. The chipset 904 may provide an interface to a random access memory ("RAM") 906, used as the main memory in the computer 900. The chipset 904 may further provide an interface to a computer-readable storage medium such as a read-only memory ("ROM") 908 or non-volatile RAM ("NVRAM") for storing basic routines that help to startup the computer 900 and to transfer information between the various components and devices. The ROM 908 or NVRAM may also store other software components necessary for the operation of the computer 900 in accordance with the embodiments described herein.

According to various embodiments, the computer 900 may operate in a networked environment using logical connections to remote computing devices and computer systems through a network, such as a local-area network ("LAN"), a wide-area network ("WAN"), the Internet, or any other networking topology known in the art that connects the computer 900 to remote computers. The chipset 904 includes functionality for providing network connectivity through a network interface controller ("NIC") 910, such as a gigabit Ethernet adapter. For example, the NIC 910 may be capable of connecting the computer 900 to other computing devices, such as the application servers 110, the customer computer 104, a data storage system in the merchant system 108, and the like, over the network 106 described above in regard to FIG. 1. It should be appreciated that multiple NICs 910 may be present in the computer 900, connecting the computer to other types of networks and remote computer systems.

The computer 900 may be connected to a mass storage device 912 that provides non-volatile storage for the computer. The mass storage device 912 may store system programs, application programs, other program modules, and data, which have been described in greater detail herein. The mass storage device 912 may be connected to the computer 900 through a storage controller 914 connected to the chipset 904. The mass storage device 912 may consist of one or more physical storage units. The storage controller 914 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 900 may store data on the mass storage device 912 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 912 is characterized as primary or secondary storage, or the like.

For example, the computer 900 may store information to the mass storage device 912 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 912 by detecting the physical states or characteristics of one or more particular locations within the physical storage units.

In addition to the mass storage device 912 described above, the computer 900 might have access to other computer-readable media to store and retrieve information, such as program modules, data structures, or other data. It should be appreciated by those skilled in the art that computer-readable media can be any available media that may be accessed by the computer 900, including computer-readable storage media and communications media. Communications media includes transitory signals. Computer-readable storage media includes volatile and non-volatile, removable and non-removable storage media implemented in any method or technology.

For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 912 may store an operating system 916 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 912 may store other system or application programs and data utilized by the computer 900, such as the online shopping module 112 and/or the theming module 122, both of which were described above.

In one embodiment, the mass storage device 912 or other computer-readable storage media may be encoded with computer-executable instructions that, when loaded into the computer 900, transform the computer from a general-purpose computing system into a special-purpose computer capable of implementing the embodiments described herein. These computer-executable instructions transform the computer 900 by specifying how the CPUs 902 transition between states, as described above. According to one embodiment, the computer 900 has access to computer-readable storage media storing computer-executable instructions that, when executed by the computer, perform the various routines and operations described herein.

The computer 900 may also include an input/output controller 918 for receiving and processing input from a number of input devices, such as a keyboard, a mouse, a touchpad, a touch screen, an electronic stylus, or other type of input device. Similarly, the input/output controller 918 may provide output to a display device, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for creating ambience during on-line shopping have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system for applying a theme to a product page, the system comprising:
 a merchant system comprising one or more application servers, each application server comprising one or more hardware processors; and
 an online shopping module executing on at least one of the one or more hardware processors, the online shopping module being configured to store data identifying one or more products, to store data defining a plurality of themes, to receive a request for a page corresponding to one or more of the products and, in response to receiving the request to
 identify one or more keywords associated with the requested page,
 utilize the identified keywords to select one of the plurality of themes configured to create an ambience consistent with a product referenced by the requested page,
 apply the selected theme to the requested page, and
 return the requested page in response to the request.

2. The system of claim 1, wherein the data defining the plurality of themes comprises one or more keywords for each of the plurality of themes.

3. The system of claim 2, wherein utilizing the identified keywords to select one of the plurality of themes comprises comparing the keywords associated with the requested page to the keywords for each of the plurality of themes to select one of the plurality of themes.

4. The system of claim 2, wherein the data identifying the one or more products comprises one or more keywords associated with each of the products, wherein the requested page corresponds to a single product, and wherein utilizing the identified keywords to select one of the plurality of themes comprises comparing the identified keywords to the keywords for each of the plurality of themes to select one of the themes.

5. The system of claim 2, wherein the data identifying the one or more products comprises one or more keywords associated with one or more categories of products, wherein the requested page corresponds to a category of products, and wherein utilizing the identified keywords to select one of the plurality of themes comprises comparing the keywords associated with the one or more categories of products to the keywords for each of the plurality of themes to select one of the themes.

6. The system of claim 2, wherein the requested page corresponds to a category of products, and wherein utilizing the identified keywords to select one of the plurality of themes comprises comparing keywords associated with products in the category of products to the keywords for each of the plurality of themes to select one of the themes.

7. The system of claim 2, wherein the requested page is a search results page identifying one or more products, and wherein utilizing the identified keywords to select one of the plurality of themes comprises comparing keywords associated with the one or more products identified on the search results page to the keywords for each of the plurality of themes to select one of the themes.

8. The system of claim 2, wherein the requested page is a search results page identifying one or more products, and wherein utilizing the identified keywords to select one of the plurality of themes comprises comparing one or more search terms utilized to generate the search results page to the keywords for each of the plurality of themes to select one of the themes.

9. A computer implemented method for applying a theme to a product page, the method comprising performing computer-implemented operations for:
receiving a request for a page corresponding to one or more products;
in response to receiving the request,
identifying one or more keywords associated with the requested page,
utilizing the identified keywords to identify a product category,
selecting a theme associated with the identified product category configured to create an ambience consistent with a product referenced by the requested page,
applying the selected theme to generate the requested page, and
returning the requested page in response to the request.

10. The computer-implemented method of claim 9, wherein utilizing the identified keywords to identify a product category comprises comparing the keywords associated with the requested page to keywords associated with the product categories to identify the product category.

11. The computer-implemented method of claim 10, further comprising classifying one or more of the products into one or more sub-categories of the product categories and to storing an association between each of the sub-categories and at least one of the themes.

12. The computer-implemented method of claim 10, further comprising storing an association between one or more of the products and at least one of the themes.

13. The computer-implemented method of claim 10, wherein the requested page corresponds to a single product, and wherein identifying one or more keywords associated with the requested page comprises identifying keywords associated with the requested page from a product description associated with the single product.

14. The computer-implemented method of claim 10, wherein the requested page corresponds to a category of products, and wherein identifying one or more keywords associated with the requested page comprises identifying keywords associated with the category of products.

15. The computer-implemented method of claim 10, wherein the requested page is a search results page identifying one or more products, and wherein identifying one or more keywords associated with the requested page comprises identifying one or more search terms utilized to generate the search results page.

16. A non-transitory computer-readable storage medium having computer-executable instructions stored thereupon which, when executed by a computer, cause the computer to:
receive a request for a product page;
in response to receiving the request, to identify one or more keywords associated with the requested product page, to select one of a plurality of themes utilizing the identified keywords configured to create an ambience consistent with a product referenced by the product page, to apply the selected theme to the requested page to generate a themed page, to return the themed page in response to the request for the product page, to determine a first amount of time spent at an e-commerce site by one or more customers receiving the themed page, to determine a second amount of time spent at the e-commerce site by one or more customers not receiving the themed page, and to utilize the first amount of time and the second amount of time to determine whether the themed page should be provided to other customers.

17. The non-transitory computer-readable storage medium of claim 16, having further computer-executable instructions stored thereupon which, when executed by the computer, cause the computer to store data defining the plurality of themes, the data comprising one or more keywords for each of the plurality of themes.

18. The non-transitory computer-readable storage medium of claim 17, wherein selecting one of a plurality of themes utilizing the identified keywords comprises comparing the keywords associated with the requested page to the keywords for each of the plurality of themes to select one of the plurality of themes.

19. The non-transitory computer-readable storage medium of claim 18, wherein selecting one of a plurality of themes further comprises selecting a theme based, at least in part, on a geographic location of a customer that generated the request for the product page.

* * * * *